Jan. 20. 1925.
J. H. SMITH
CHAIN TIGHTENER
Filed May 24, 1923
1,523,565
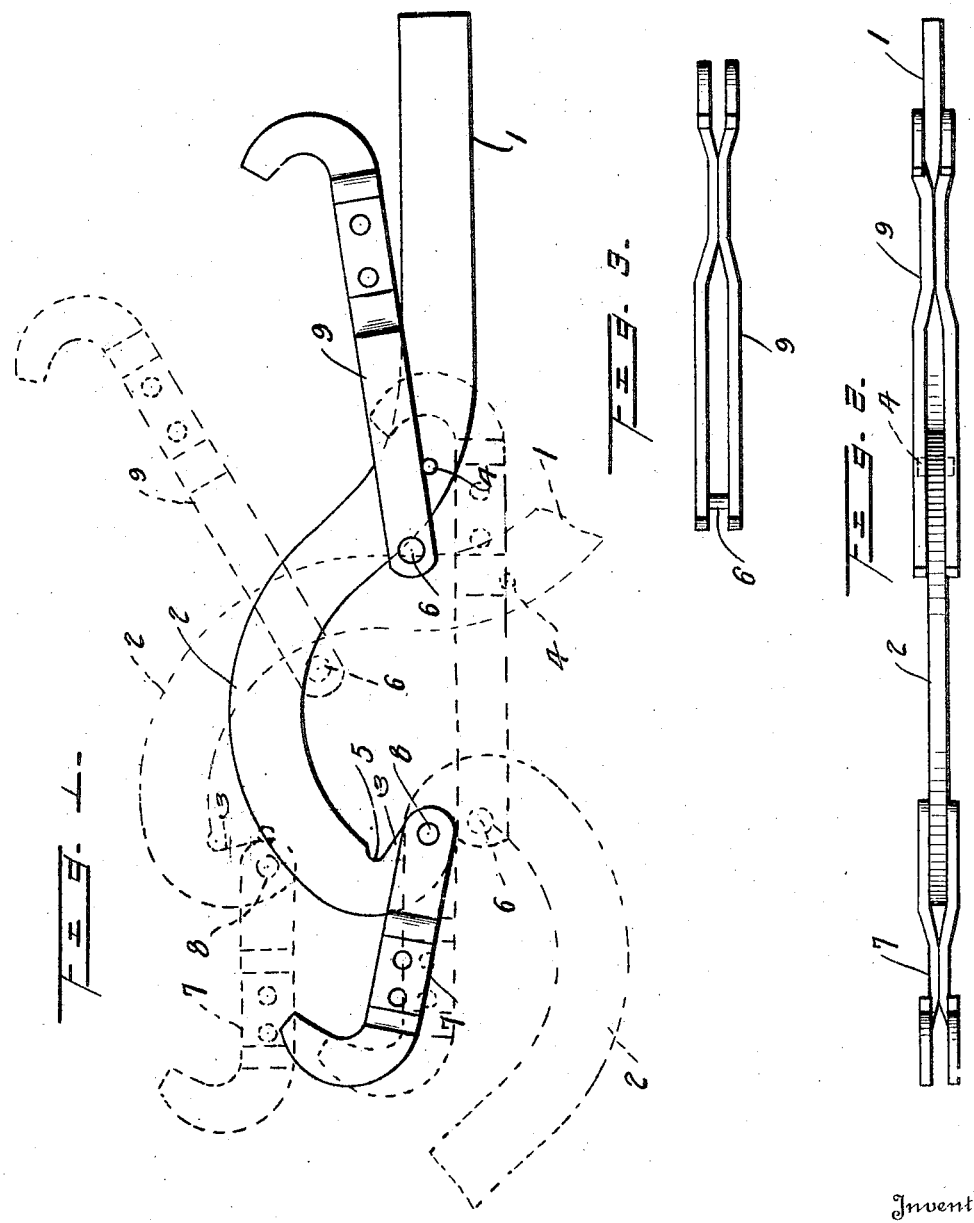
Inventor
J. H. Smith.

Patented Jan. 20, 1925.

1,523,565

UNITED STATES PATENT OFFICE.

JOHN H. SMITH, OF DENTON, NEBRASKA.

CHAIN TIGHTENER.

Application filed May 24, 1923. Serial No. 641,172.

*To all whom it may concern:*

Be it known that I, JOHN H. SMITH, a citizen of the United States, residing at Denton, in the county of Lancaster and State of Nebraska, have invented certain new and useful Improvements in Chain Tighteners; and I do hereby declare the following to be a full, clear, and exact description of the invention, such as will enable others skilled in the art to which it appertains to make and use the same.

The main object of the invention is the provision of a tool whereby a tire chain may be easily and conveniently tightened without necessitating the jacking up of the wheel, even though the latter may be standing in mud, sand or slush, the tool being of such construction as to hold the chain when tightened so that both hands may be employed to manipulate the chain connector.

A further object of the invention is the provision of a tool which, in operation will not tend to twist and which will not injure the ordinary tire chain when tightening the same.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a chain tightener embodying the invention, the hook members being shown separated by full lines and the dotted lines indicating an intermediate adjusted position of the hook members and the position of the same when drawn together, Figure 2 is a top plan view of the device, and Figure 3 is a top plan view of the sliding hook member.

Corresponding and like parts are referred to in the following description and designated in the accompanying drawings by like reference characters.

The tool comprises essentially three members, a lever and two hooks one of the hooks being pivoted and the other hook being slidable. Each of the hook members preferably comprises companion elements having the lever arranged therebetween and the nibs or hooks spaced apart so as to embrace opposite sides of an ordinary tire chain without tending to injure or strain the same.

The lever member comprises a handle 1, a curved guide 2 and a rearwardly inclined extension 3. A short pin 4 is fitted in an opening of the lever and projects from opposite sides thereof and constitutes a stop to limit the outward movement of the sliding hook member. The stop 4 is located at the juncture of the handle 1 and curved guide 2. A recess 5 is provided at the base of the rearwardly inclined extension 3 and forms a seat for the pin 6 connecting the elements comprising the sliding hook member.

A short hook member 7 is pivoted at 8 to the extremity of the rearwardly inclined extension 3 and the elements comprising the same are drawn together intermediate their extremities and are riveted or otherwise secured.

The sliding hook member 9 is constructed in a similar manner to the pivoted hook 7 and the inner elements are connected by means of the pin 6 which engages and rides upon the inner curved edge of the guide 2. The hook member 9 is slidably mounted upon the curved guide 2 and is prevented from displacement by means of the stop 4. The nibs or engaging elements of the hook members are spaced apart so as to engage opposite sides of the ordinary chain link and obviate injury thereto. In the event of a large and heavy chain, the nibs of the hook members may enter the links.

In the operation of the tool, the hook members are spaced apart so as to appear at opposite ends of the curved guide 2 of the lever member and in this position, the nibs of the hooks are engaged with links at the ends of the chain to be drawn together. The lever member is now operated so as to draw the hooks together, the hook member 9 sliding upon the curved guide 2, as indicated by the dotted lines in Figure 1. When the position of the lever is reversed, as indicated by the dotted lines in Figure 1, the hooks are drawn together and are held in such position since the pivoted hook 7 is disposed within the curved guide 2 and the pin 6 of the sliding hook 9 is seated in the recess 5 the line of strain being approximately in line with the lever and hook members with the result that the parts remain in the extreme position indicated by the dotted lines in Figure 1 with the hook members drawn together. As a result, both hands of the operator are free to manipulate the connector for securing the ends of the chain preliminary to removing the tool.

What is claimed is:

A chain tightener comprising a lever member having a handle, a curved portion at the end of the handle, and its end formed with an extension inclined toward the handle having a recess at the base of said inclined extension, a stop projecting laterally from the lever adjacent the inner end of the curved portion, a hook pivoted to the extremity of the inclined extension, and a second hook slidable upon the curved end portion of the lever and movable during operation to a position in substantial parallelism with the first mentioned hook, said second hook having an element adapted to occupy said recess in the latter position.

In testimony whereof I affix my signature in presence of two witnesses.

JOHN H. SMITH.

Witnesses:
 W. T. VASSO,
 T. Q. HILL.